United States Patent [19]
Imai et al.

[11] Patent Number: 6,019,700
[45] Date of Patent: Feb. 1, 2000

[54] VARIABLE PRESSURE GAIN CONTROL SYSTEM FOR A CVT

[75] Inventors: Norio Imai; Junichi Tokunaga; Hirofumi Nozawa, all of Anjo, Japan

[73] Assignee: Aisin AW Co., Ltd., Anjo, Japan

[21] Appl. No.: 09/102,906

[22] Filed: Jun. 23, 1998

[30]     Foreign Application Priority Data

Jul. 4, 1997   [JP]   Japan ..................................... 9-180098
Aug. 11, 1997  [JP]   Japan ..................................... 9-216824

[51] Int. Cl.$^7$ ................................................. B60K 41/12
[52] U.S. Cl. ............................................. 477/45; 477/158
[58] Field of Search ................................ 477/45, 46, 48, 477/156, 158

[56]              References Cited

U.S. PATENT DOCUMENTS 5,157,992  10/1992  Hayashi et al. ......................... 477/45 X
5,203,233   4/1993  Hattori et al. .......................... 477/45 X Primary Examiner—Khoi Q. Ta
Attorney, Agent, or Firm—Oliff & Berridge, PLC

[57]              ABSTRACT

For achieving a high accuracy line pressure control and a high line pressure, a valve control system outputs a first signal pressure to a primary regulator valve as a second signal pressure when the first signal pressure is low. The valve control system outputs a gain pressure higher than the first signal pressure to the primary regulator valve as the second signal pressure when the first signal pressure is high. A change amount of the line pressure from the primary regulator valve concerning with a change amount of the first signal pressure is a gain. The gain is a low gain which increases the accuracy of the line pressure control when the first signal pressure is low, and the gain is a high gain with which the high line pressure is output when the first signal pressure is high.

12 Claims, 11 Drawing Sheets

VARIABLE PRESSURE GAIN CONTROL SYSTEM FOR A CVT

BACKGROUND OF THE INVENTION

1. Field of Invention

The invention relates to a hydraulic control system for an automatic transmission. More specifically, it relates to the hydraulic control system, which controls an output pressure with a different amplification factor related to a signal pressure, for an automatic transmission.

2. Description of Related Art

Generally, in a conventional hydraulic control system for an automatic transmission, a linear solenoid valve outputs a signal pressure, the signal pressure is input to a primary regulator valve, and the primary regulator valve regulates a line pressure to an output pressure properly based on the signal pressure. Then, many kinds of controls are performed based on the output pressure. A change rate of the output pressure from the primary regulator valve related to a change in the signal pressure output from the linear solenoid valve is made using an amplification factor, which is called a gain from now on. The gain is set so that the line pressure is regulated to the output pressure needed for the hydraulic controls within the range of the signal pressure which is output from the linear solenoid valves. That is to say, the gain is set so that the change range of the output pressure is achieved within the change range of the signal pressure.

For example, in a continuously variable transmission which performs non-stage shift by changing a pulley ratio between two pulleys joined with a belt, an unusually high output pressure is needed. That is to say, in such a continuously variable transmission, the pulley ratio is changed by increasing and decreasing a tension on the belt by a fixed sheave and a movable sheave that comprise each pulley. The tension on the belt needs to change over a wide range. Therefore, the output pressure from the primary regulator valve for achieving the tension on the belt over the wide range needs to change over a wide range. As a way for achieve the wide change range of the output pressure, the change range of the signal pressure may be made large. In this case, the linear solenoid valve needs to be large to achieve the wide change range for the signal pressure. Therefore, a large space for positioning the large linear solenoid valve is needed and costs increase.

Another way to achieve the wide change range of the output pressure considering the aforementioned disadvantages, it is possible to make the gain large. In this case, when the gain is large, the change in the output pressure is large related to the change in the signal pressure. Then, however, the dispersion of the output pressure becomes large due to vibration in the signal pressure. Therefore, it is difficult to achieve high accuracy control for the output pressure. That is, in the case where the change range of the signal pressure is stable, when the gain is set to be large, the change range of the output pressure becomes large and the high output pressure is achieved, but high accuracy control for the output pressure is difficult. When the gain is set to be small, high accuracy control for the output pressure is achieved, but the change range of the output pressure becomes small and the necessary high output pressure is not obtained.

Actually, in a vehicle mounting the aforementioned continuously variable transmission, the continuously variable transmission needs the large output pressure at, for example, the vehicle start because the pulley ratio must be greatly changed. And, for example, during a settled speed driving, the continuously variable transmission needs a small output pressure for the purpose of, for example, minimizing fuel consumption and maintaining a high accuracy control for the output pressure. That is to say, in the continuously variable transmission, when the continuously variable transmission needs low output, a small gain is proper. When the continuously variable transmission needs high output, a large gain is proper.

The linear solenoid valves and regulator valves have dispersions caused by, for example, manufacturing accuracy and assembly accuracy of the valve body and spools, and the spring load of the spring loaded spools in each assembly. Therefore, the signal pressure from the linear solenoid valves and control pressures from the regulating valves have a dispersion related to the same current value in each hydraulic circuit. That is, the control pressure as output, related to the current value as input, has a degree of dispersion.

For reducing the dispersion in each hydraulic circuit, an adjusting mechanism is arranged in the linear solenoid valve. Used as the adjusting mechanism, for example, is an adjusting screw for increasing and decreasing the spring load of the spring loaded spool. In this case, the spring load can be increased and decreased by the adjusting screw in the each hydraulic circuit and, then, the signal pressure and the control pressure related to the signal pressure are regulated. The proper control pressure is thereby achieved.

FIG. 12 shows an example for regulating the control pressure in the related art. FIG. 12 shows linearly changing the control pressure $P_L$, with the dispersion found in various hydraulic circuits related to the current values I of the linear solenoid valves. In FIG. 12, solid line A shows a target value, upper side alternating long and two short dash line $a_1$ shows a maximum value of the dispersion before adjustment, a lower side alternate long and two short dash line $a_2$ shows a minimum value of the dispersion before adjustment, an upper side alternate long and short dash line $b_1$ shows a maximum value of the dispersion after adjustment, and a lower side alternate long and short dash line $b_2$ shows a minimum value of the dispersion after adjustment.

The control pressure $P_L$ is adjusted as follows.

In the related art, an adjusting point (basic point) is set on a low pressure side of the control pressure $P_L$, and the control pressure $P_L$ is regulated so that the control pressure $P_L$ is a predetermined control pressure $P_A$. Actually, the current value of the linear solenoid is maintained at a predetermined value. Then, while watching the control pressure output from the regulator valve, a thrust amount of the adjusting screw is adjusted, and the adjustment is ended when the control pressure $P_L$ reaches the predetermined control pressure $P_A$.

When adjusting from the upper side alternate long and two short dashes line $a_1$, the thrust amount of the adjusting screw is increased and the left end of the line $a_1$ is set to the predetermined control pressure $P_A$. When adjusting from the lower side alternate long and two short dashes line $a_2$, the thrust amount of the adjusting screw is decreased and the left end of the line $a_2$ is set to the predetermined control pressure $P_A$. By this process, the lines $a_1$, $a_2$ are displaced in parallel and changed to the lines $b_1$, $b_2$.

By performing the adjustment for the each hydraulic circuit, the predetermined control pressure $P_A$ is achieved for the predetermined current value of the linear solenoid valve in each hydraulic circuit. That is, the predetermined control pressure is set to correspond to the predetermined current value.

But in the related art, the dispersion after adjustment is large when the control pressure $P_L$ is high because the adjusting point is set for the low pressure side of the control pressure $P_L$. Therefore, the hydraulic pressure that may be output is too great compared with the target value A shown in FIG. 12. As a result, it is necessary to consider the strength and durability of the hydraulic circuit when such a high pressure results.

Conversely, when the adjusting point is set at the high pressure side of the control pressure $P_L$, the dispersion is reduced at the adjusting point on the high pressure side, but the dispersion is increased at the low pressure side. Therefore, it is necessary to set the lowest control pressure high so that the control pressure is enough for the large dispersion at the low pressure side.

When the adjusting point of the control pressure $P_L$ is set on the low pressure side, the dispersion is increased at the high pressure side, and when the adjusting point of the control pressure $P_L$ is set on the high pressure side, the dispersion is increased at the low pressure side. That is to say, the dispersion of the control pressure $P_L$ is increased in a side which is far away from the adjusting point because the adjustment by the adjusting screw does not change the slope of the lines in FIG. 12, it just displaces them in parallel.

SUMMARY OF THE INVENTION

Therefore, an object of the invention is to provide a hydraulic control system, which achieves both a high accuracy control for an output pressure and a high output pressure by changing an amplification factor, also called a gain, related to a change in a signal pressure, for an automatic transmission.

An another object of the invention is to reduce the dispersion in the output pressure, which is a control pressure, by setting two adjusting points.

In order to achieve the aforementioned objects, a hydraulic control system for an automatic transmission comprises a signal pressure output device which outputs a first signal pressure, an amplification factor changing device which receives the first signal pressure from the signal pressure output device and outputs a second signal pressure based on the first signal pressure, and a regulating device which receives the second signal pressure from the amplification factor changing device and regulates an output pressure based on the second signal pressure. The amplification factor changing device changes the amplification factor, which is the change rate of the output pressure with respect to the change in the first signal pressure, to a low amplification factor and a high amplification factor within a change range of the first signal pressure. The amplification factor changing device comprises a gain control valve which outputs a gain pressure regulated based on the first signal pressure and a selecting device which selects the second signal pressure from the first signal pressure and the gain pressure based on their strength.

The selecting device comprises a check ball which selects the higher pressure from the first signal pressure and the gain pressure as the second signal pressure, and outputs the second signal pressure to the regulating device.

The first signal pressure is input to the regulating device as the second signal pressure and the amplification factor is changed to the low amplification factor when the first signal pressure from the signal pressure output device is lower than a predetermined value, and the gain pressure higher than the first signal pressure is input to the regulating device as the second signal pressure and the amplification factor is changed to the high amplification factor when the first signal pressure from the signal pressure output device is higher than the predetermined value.

The gain control valve regulates the output pressure regulated by the regulating device to the gain pressure. The gain control valve regulates the gain pressure from low to high when the first signal pressure is changed from low to high.

The hydraulic control system for an automatic transmission comprises a first adjusting mechanism which regulates the first signal pressure by adjusting the signal pressure output device and a second adjusting mechanism which regulates the gain pressure by adjusting the gain control valve. The first adjusting mechanism regulates the first signal pressure based on a basic point on a low pressure side of the output pressure from the regulating device, and the second adjusting mechanism regulates the gain pressure based on a basic point on a high pressure side of the output pressure from the regulating device.

The adjustment for the first signal pressure by the first adjusting mechanism is performed earlier than the adjustment for the gain pressure by the second adjusting mechanism.

In another way for achieving the aforementioned objects, a hydraulic control system for an automatic transmission comprises a signal pressure output device which outputs a first signal pressure, an amplification factor changing device which receives the first signal pressure from the signal pressure output device and outputs a second signal pressure based on the first signal pressure and a regulating device which receives the second signal pressure from the amplification factor changing device and regulates an output pressure based on the second signal pressure. The amplification factor changing device changes an amplification factor, which is the change rate of the output pressure with respect to the change of the first signal pressure, to a low amplification factor and a high amplification factor within a change range of the first signal pressure. The amplification factor changing device comprises a gain control valve which outputs a gain pressure regulated based on the first signal pressure. The amplification factor changing device outputs the first signal pressure as the second signal pressure to the regulating device when the first signal pressure is lower than a predetermined value, and the amplification factor changing device outputs both of the first signal pressure and the gain pressure as the second signal pressure to the regulating device when the first signal pressure is higher than or equal to the predetermined value.

The gain control valve regulates the output pressure regulated by the regulating device to the gain pressure. The gain control valve regulates the gain pressure from low to high when the first signal pressure is changed from low to high.

The hydraulic control system for an automatic transmission comprises a first adjusting mechanism which regulates the first signal pressure by adjusting the signal pressure output device and a second adjusting mechanism which regulates the gain pressure by adjusting the gain control valve. The first adjusting mechanism regulates the first signal pressure based on a basic point on a low pressure side of the output pressure from the regulating device, and the second adjusting mechanism regulates the gain pressure based on a basic point on a high pressure side of the output pressure from the regulating device. The adjustment for the first signal pressure by the first adjusting mechanism is performed earlier than the adjustment for the gain pressure by the second adjusting mechanism.

According to the invention, the amplification factor (gain) of the output pressure related to the first signal pressure is changed to the low gain by the amplification factor changing device. Therefore, the change of the output pressure related to the first signal pressure is reduced. As a result, the accuracy of the output pressure related to the first signal pressure is increased. Further, the amplification factor (gain) of the output pressure related to the first signal pressure is changed to the high gain by the amplification factor changing device. Therefore, the change of the output pressure related to the first signal pressure is increased. As a result, the high output pressure is achieved. In this case, one pressure is selected from the first signal pressure and the gain pressure based on their height, and the selected pressure is output as the second signal pressure to the regulating device by the gain control valve and the selecting device. Then, the gain, which is achieved when the first signal pressure is input to the regulating device, and the gain, which is achieved when the gain pressure is input to the regulating device, differ. Therefore, two different gains, that is to say, the low gain and the high gain, are achieved.

The higher pressure is easily selected from the first signal pressure and the gain pressure by the check ball. Therefore, the structure for selecting is simplified.

In the case where the first signal pressure is increased, the first signal pressure is selected as the second signal pressure and is output to the regulated device, and the gain is changed to the low gain when the first signal pressure is lower than the predetermined value, and the gain pressure higher than the first signal pressure is selected as the second signal pressure and is output to the regulated device with the gain changed to the high gain when the first signal pressure is higher than the predetermined value. That is to say, in the case the first signal pressure is increased, the gain is automatically changed from the low gain to the high gain based on the predetermined value. The gain pressure is stabilized because the gain pressure is regulated from the output pressure regulated by the regulating device.

When the first signal pressure is increased, the gain pressure is increased. The first signal pressure is regulated based on the basic point on the low pressure side of the low output pressure from the regulating device. The gain pressure is regulated based on the basic point on the high pressure side of the high output pressure from the regulating device. That is to say, the output pressure from the regulating device is regulated based on the two basic points on the low pressure side and the high pressure side, respectively, by the first adjusting mechanism and the second adjusting mechanism. Therefore, the dispersion of the output pressure from the regulating device is reduced at the low pressure side and the high pressure side, and the accuracy of the output pressure is increased.

The gain control valve is controlled by the signal pressure output device. Therefore, the gain pressure is influenced by the first signal pressure. As a result, if the gain control valve is adjusted by the second adjusting mechanism before the signal pressure output device is adjusted by the first adjusting mechanism, the accuracy of the control is reduced. To address the problem, the signal pressure output device is adjusted by the first adjusting mechanism before the gain control valve is adjusted by the second adjusting mechanism. Therefore, the accuracy of the control is increased because the first signal pressure is not influenced by the gain pressure.

According to another structure of the invention, the amplification factor (gain) of the output pressure related to the first signal pressure is changed to the low gain by the amplification factor changing device. Therefore, the change of the output pressure related to the first signal pressure is reduced. As a result, the accuracy of the output pressure related to the first signal pressure is increased. Further, the amplification factor (gain) of the output pressure related to the first signal pressure is changed to the high gain by the amplification factor changing device. Therefore, the change of the output pressure related to the first signal pressure is increased. As a result, the high output pressure is achieved. In this case, the first signal pressure is input to the regulating device as the second signal pressure when the first signal pressure is lower than the predetermined value, and both of the first signal pressure and the gain pressure are input to the regulating device as the second signal pressure when the first signal pressure is higher than the predetermined value. Then, the gain, which is achieved when the first signal pressure is input to the regulating device, and the gain, which is achieved when the first pressure and the gain pressure are input to the regulating device, differ. Therefore, two different gains, that is to say, the low gain and the high gain, are achieved. Further, the gain is changed smoothly because the first signal pressure is always input to the regulating device.

The gain pressure is stabilized because the gain pressure is regulated from the output pressure regulated by the regulating device. When the first signal pressure is increased, the gain pressure is increased.

The first signal pressure is regulated based on the basic point on the low pressure side of the low output pressure from the regulating device. The gain pressure is regulated based on the basic point on the high pressure side of the high output pressure from the regulating device. That is to say, the output pressure from the regulating device is regulated based on the two basic points on the low pressure side and the high pressure side, respectively, by the first adjusting mechanism and the second adjusting mechanism. Therefore, the dispersion of the output pressure from the regulating device is reduced at the low pressure side and the high pressure side, and the accuracy of the output pressure is increased.

The gain control valve is controlled by the signal pressure output device. Therefore, the gain pressure is influenced by the first signal pressure. As a result, if the gain control valve is adjusted by the second adjusting mechanism before the signal pressure output device is adjusted by the first adjusting mechanism, the control accuracy is reduced. To address the problem, the signal pressure output device is adjusted by the first adjusting mechanism before the gain control valve is adjusted by the second adjusting mechanism. Therefore, the control accuracy is increased because the first signal pressure is not influenced by the gain pressure.

BRIEF DESCRIPTION OF THE DRAWINGS

The invention will be described in conjunction with the following drawings in which like features are designated with like reference characters, and wherein.

DETAILED DESCRIPTION OF PREFERRED EMBODIMENTS

The invention will become more apparent from a detailed description of preferred embodiments with reference to the accompanying drawings.

Throughout this description words like upper, lower, up, and down are used to convey directions. These words are relative to the figures and do not reflect an absolute direction. Terms such as first direction, opposite direction, and second direction could also be used but would have required the addition of arrows to the figures and additional explanation. Thus, for simplicity, words related to the visual representation are used and are not meant to be limiting.

The first embodiment of the invention will be described in the following order:

(1) a structure of a continuously variable transmission supplied with a hydraulic control system for an automatic transmission.

(2) a structure of a hydraulic circuit which is a basis of the invention.

(3) operations of the continuously variable transmission and the hydraulic circuit.

(4) regulation of a line pressure $P_L$.

(5) a structure of the hydraulic control system for an automatic transmission.

(6) an operation of the hydraulic control system.

(7) adjusting valves in the hydraulic control system.

The structure of a continuously variable transmission supplied with a hydraulic control system for an automatic transmission of the invention will be described with reference to FIG. 1. The figure shows an outline structure of a continuously variable transmission for a vehicle supplied with a hydraulic control system for an automatic transmission.

Figure 1:
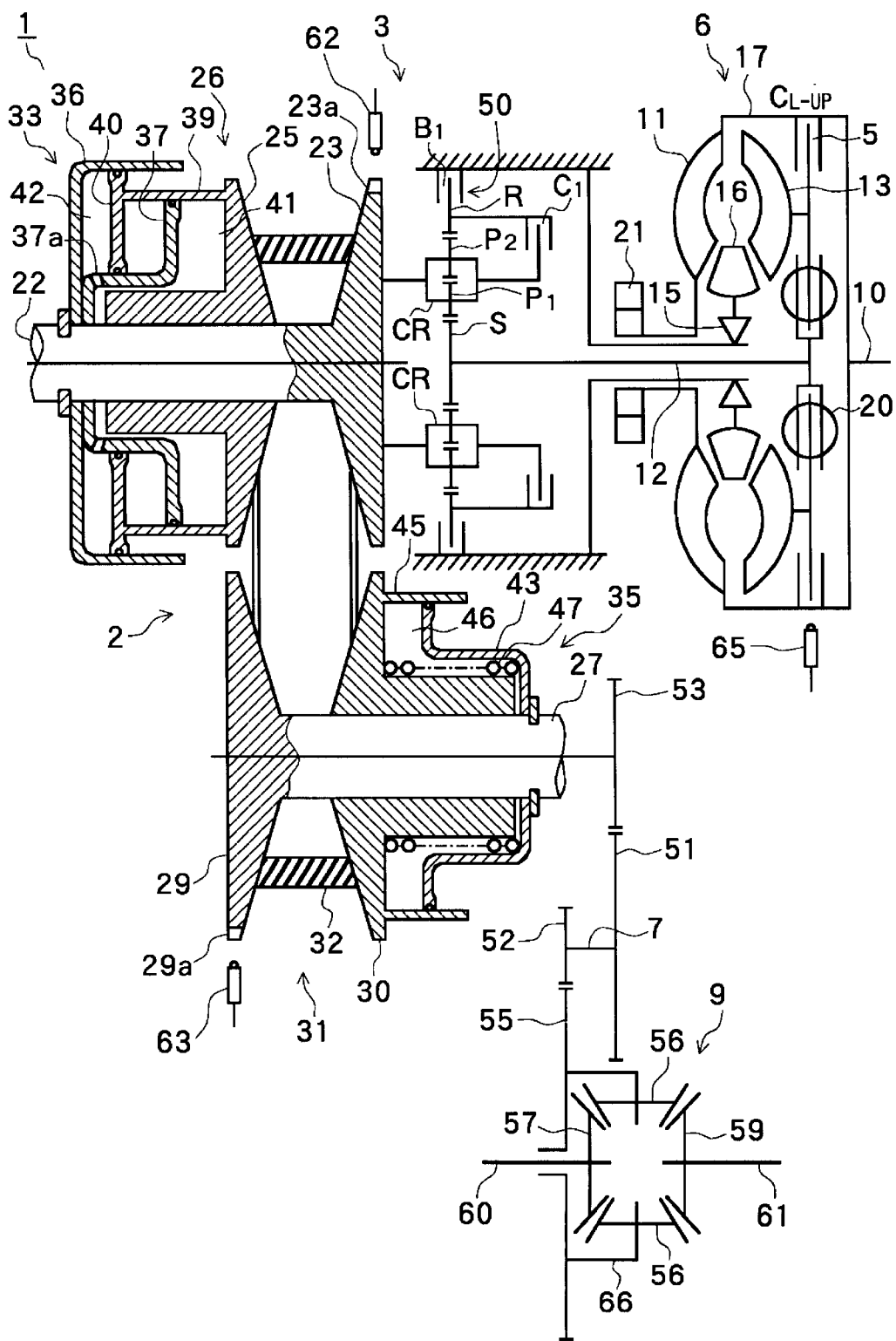
FIG. 1 is a schematic diagram of a continuously variable transmission of the invention.

As shown in FIG. 1, the continuously variable transmission 1 comprises a CVT 2 (which is a belt-type continuously variable transmission mechanism), a forward/reverse mode selecting device 3, a torque converter 6 equipped with a lock-up clutch 5, a counter shaft 7, and a differential device 9. These devices are covered by a partitioned case.

The torque converter 6 comprises a pump impeller 11 connected to an engine output shaft 10 via a front cover 17, a turbine runner 13 connected to an input shaft 12, and a stator 16 supported on the transmission case via a one-way clutch 15. A lock-up clutch 5 is interposed between the input shaft 12 and the front cover 17. A damper spring 20 is interposed between the lock-up clutch plate and the input shaft 12. An oil pump 21 is connected to and driven by the pump impeller 11.

The CVT 2 comprises a primary pulley 26, a secondary pulley 31, and a metal belt 32 wrapped around the pulleys 26, 31. The primary pulley 26 comprises a fixed sheave 23 fixed to a primary shaft 22 and a movable sheave 25 axially slidably supported by the primary shaft 22. The secondary pulley 31 comprises a fixed sheave 29 fixed to a secondary shaft 27 and a movable sheave 30 axially slidably supported by secondary shaft 27.

A hydraulic actuator 33, comprising a double piston, is disposed behind the movable sheave 25 on the primary side. A hydraulic actuator 35, comprising a single piston, is disposed behind the movable sheave 30 on the secondary side. The hydraulic actuator 33 on the primary side comprises a cylinder member 36 and a reaction support member 37 fixed to the primary shaft 22 and a piston member 40 and a cylindrical member 39 fixed to the movable sheave 25. A first hydraulic chamber 41 is formed from the cylindrical member 39, the reaction support member 37, the primary shaft 22, and the back surface of the movable sheave 25. A second hydraulic chamber 42 is formed from the cylinder member 36, the piston member 40, and the reaction support member 37. The first hydraulic chamber 41 and the second hydraulic chamber 42 are made continuous via a continuous hole 37a. As a result of the combination of equal hydraulic pressures in hydraulic chambers 41, 42, a force in the axial direction is generated that is roughly double that of a secondary-side hydraulic actuator 35. The secondary-side hydraulic actuator 35 comprises a reaction support member 43 fixed to the secondary shaft 27 and a cylindrical member 45 fixed to the back surface of the movable sheave 30. A single hydraulic chamber 46 is formed by these members and the secondary shaft 27. A pre-loading spring 47 is interposed and compressed between the movable sheave 30 and the reaction support member 43.

The forward/reverse mode selecting device 3 comprises a double pinion planetary gear 50, a reverse brake B1, and a direct clutch C1. In the double pinion planetary gear 50, a sun gear S is connected to the input shaft 12, a carrier CR supporting a first pinion P1 and a second pinion P2 is connected to the primary-side fixed sheave 23, a ring gear R is connected to the reverse brake B1, and the direct clutch C1 is interposed between the carrier CR and the ring gear R.

A large gear 51 and a small gear 52 are fixed to the counter shaft 7. The large gear 51 meshes with a gear 53 fixed to the secondary shaft 27. The small gear 52 meshes with a gear 55 of the differential device 9. In the differential device 9, the rotation from a differential gear 56 supported by a differential case 66, which contains the gear 55, is transferred via left and right side gears 57, 59 to left and right axles 60, 61.

Multiple irregularity portions 23a are formed with an equal spacing on the outer portion of the primary-side fixed sheave 23 by gear cutting. An electromagnetic pick-up 62 is fixed on a position, which faces to the irregularity portions 23a, of a case. Further, multiple irregularity portions 29a are formed with an equal spacing on the outer portion of the secondary-side fixed sheave 29 by gear cutting. An electromagnetic pick-up 63 is fixed on a position, which faces to the irregularity portions 29a, of the case. The electromagnetic pick-ups 62, 63 are arranged so that the detecting surfaces of the electromagnetic pick-ups 62, 63 are closed to the irregularity portions 23a, 29a. The electromagnetic pick-up 62 provides a primary (input) rotation speed sensor for detecting the irregularity portions 23a. The electromagnetic pick-up 63 provides a secondary (output) rotation speed sensor (vehicle speed sensor) for detecting the irregularity portions 29a. An electromagnetic pick-up 65 is arranged close to the front cover 17. The electromagnetic pick-up 65 provides an engine rotation speed sensor.

An input torque is calculated as follows. An engine torque is obtained from a map based on a throttle opening and an engine rotation speed. Such maps are known by those skilled in the art. A speed ratio is calculated based on an input rotation speed and an output rotation speed of the torque converter 6. A torque ratio is obtained from a map based on the speed ratio. Such maps are also known to those skilled in the art. The input torque is calculated by multiplying the torque ratio and the engine torque.

The structure of the hydraulic circuit of the continuously variable transmission 1 will be described with reference to FIG. 2. In the invention, to be discussed below, an amplification factor changing device, for example, a gain control valve 110 in FIG. 4, is added to the hydraulic circuit shown in FIG. 2.

Figure 2:
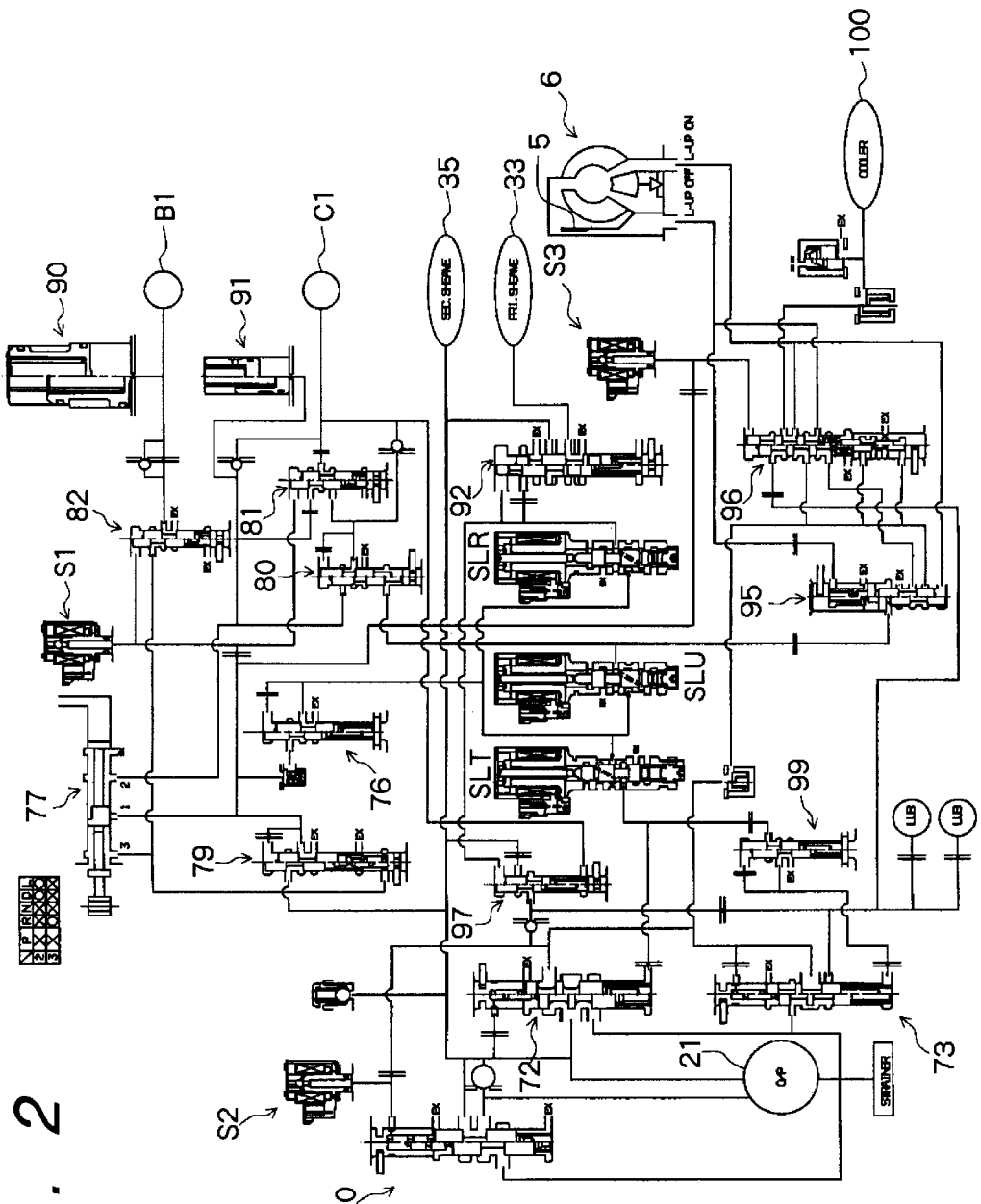
FIG. 2 is a figure showing a hydraulic circuit which is a basis of the invention.

In FIG. 2, there is shown an oil pump 21, an oil pump control valve 70, and a pump solenoid valve S2 for the oil pump control valve. There is also shown a primary regulator valve 72, a secondary regulator valve 73, a line pressure linear solenoid SLT for controlling the line pressure, a lock-up linear solenoid valve SLU for a lock-up control, a ratio linear solenoid valve SLR for a ratio control, and a modulator valve 76 for controlling the solenoid valves.

Figure 4:
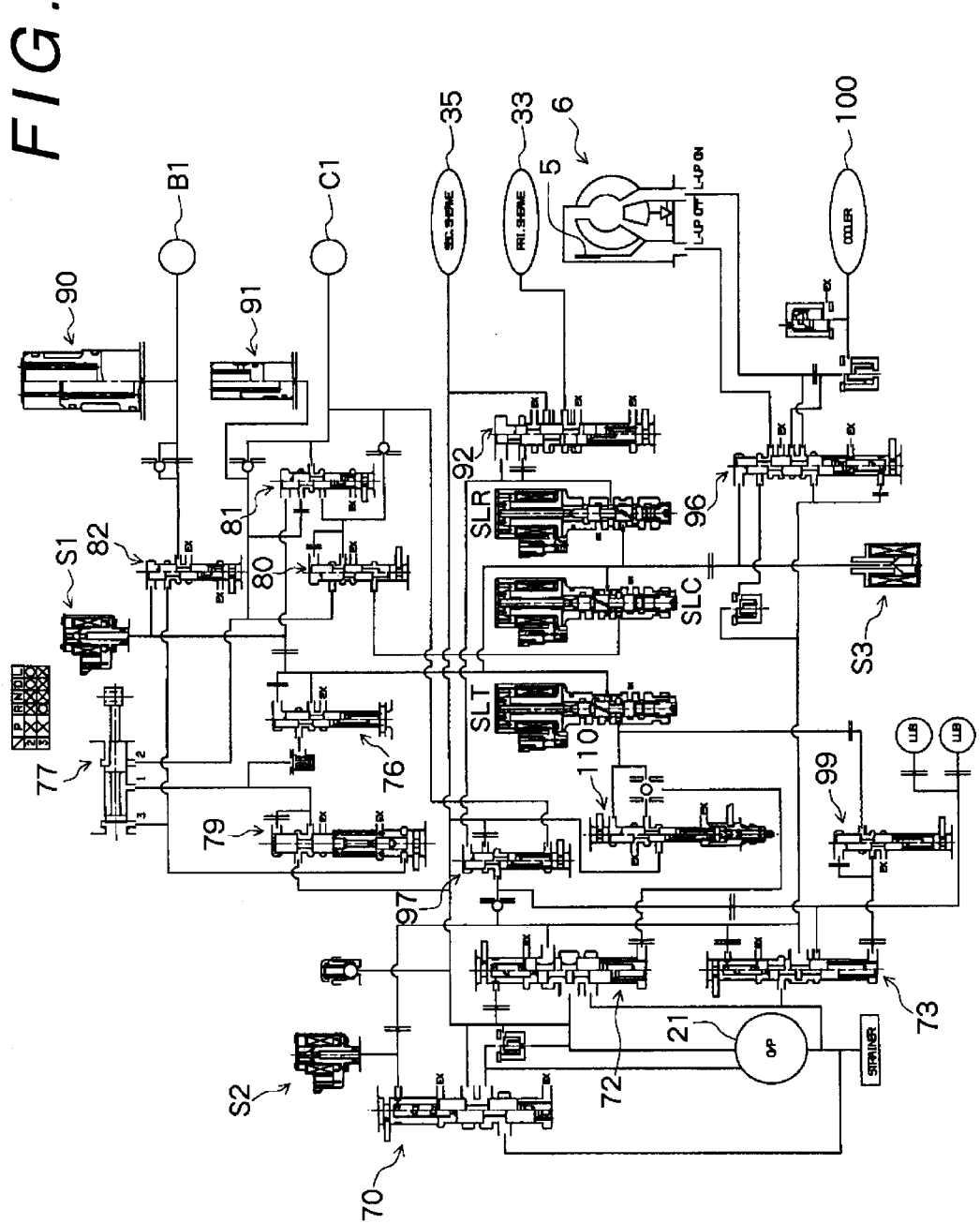
FIG. 4 is a figure showing a hydraulic circuit of the invention.

A manual valve 77 is operated manually to switch a modulated pressure modulated by a clutch modulator valve 79 from a port 1 to a port 2 or a port 3 as shown in the table in FIGS. 2 or 4. In FIG. 2, there is also shown a C1 control valve 80, a neutral relay valve 81, a reverse inhibit valve 82, and a solenoid S1 for controlling forward/reverse. There is also shown a hydraulic servo C1 for the direct clutch C1, a hydraulic servo B1 for the reverse brake B1, an accumulator 90 for the hydraulic servo B1, and an accumulator 91 for the hydraulic servo C1. There is also shown a ratio control valve 92, a primary-side hydraulic actuator 33, and a secondary-side hydraulic actuator 35. Also shown is a lock-up control valve 95, a lock-up relay valve 96, and a solenoid valve S3 for changing the lock-up state. In FIG. 2, EX shows a drain port. There is also shown a bypass control valve 97, a secondary control pressure modulator valve 99, and a cooler 100.

Operation of the continuously variable transmission 1 and the hydraulic circuit will now be described. A predetermined pressure is obtained by operation of the oil pump 21 based on the engine rotation. The predetermined pressure is regulated to a line pressure $P_L$ by A5 the primary regulator valve 72 based on the line pressure linear solenoid valve SLT which is controlled by a signal, the signal calculated based on the pulley ratio and the input torque, from a control unit. The line pressure $P_L$ is regulated to a secondary pressure $P_S$ by the secondary regulator valve 73 to be discussed below. When a high line pressure is not needed, for example, when a vehicle is stopped, the pump solenoid valve S2 is controlled based on a signal from the control unit so that the oil pump control valve 70 is moved to right half side position, as shown in FIG. 2 and the predetermined pressure from the oil pump 21 is circulated.

When the manual valve 77 is in D (drive) range or L (low) range, the hydraulic pressure from the port 1 is applied, via the port 2, to the hydraulic servo C1 for the direct clutch C1 and the direct clutch C1 is engaged. In this state, the rotation from the engine output shaft 10 is transferred to the primary pulley 26 via the torque converter 6, the input shaft 12, and the planetary gear 50 which is in a direct connecting state as a result of the engagement of the direct clutch C1. The rotation is transferred to the secondary shaft 27 via the CVT 2, when the CVT2 is modified properly, and is then transferred to the left and right axles 60, 61 via the counter shaft 7 and the differential device 9.

When the manual valve 77 is moved to R (reverse) range, the hydraulic pressure from he port 1 is applied to the hydraulic servo B1 for the brake B1 via the port 3. In this state, a ring gear R of the planetary gear 50 is engaged, while the rotation of a sun gear S from input shaft 12 is converted to a reverse rotation by the carrier CR, and the reverse rotation is transferred to the primary pulley 26.

In the CVT 2, the line pressure $P_L$ from the primary regulator valve 72 is applied to the hydraulic actuator 35 of the secondary pulley 31 so that a belt grasping force related to the input torque and the shift ratio is applied. The ratio linear solenoid valve SLR, for the ratio control, is controlled based on the shift signal from the control unit, and the ratio control valve 92 is controlled by the signal pressure from the ratio linear solenoid valve SLR. The regulated pressure from the output port of the ratio control valve 92 is applied to the hydraulic actuator 33, which comprises the double piston, for the primary pulley 26. Then, the transmission ratio of the CVT 2 is controlled properly.

The torque of the engine output shaft 10 is transferred to the input shaft 12 via the torque converter 6. Especially, when drive of a vehicle is started, the torque is converted to be high by the torque converter 6 and is transmitted to the input shaft 12. Then, a vehicle starts smoothly. The torque converter 6 comprises the lock-up clutch 5. At high speed stabilized driving, the lock-up clutch 5 is engaged, then the engine output shaft 10 is connected to the input shaft 12 directly so that a power loss based on oil in the torque converter is reduced.

Regulation of the line pressure $P_L$ will be described with reference to FIG. 3. A spring 72b is compressed and arranged in a first end chamber 1 of the primary regulator valve 72. A control pressure output from the output port m of the line pressure linear solenoid valve SLT is input to the first end chamber 1 via an orifice 101. The line pressure $P_L$ is input to a second end chamber n of the primary regulator valve 72 via an orifice 102. Therefore, a spool 72a is operated by the control pressure input to the first end chamber 1 and the feedback pressure input to the second end chamber n. Then, a hydraulic pressure applied from the oil pump 21 to a port o of the primary regulator valve 72 is regulated by connecting the port o to a drain port EX and a secondary port q at a predetermined rate. Then, the line pressure $P_L$ calculated based on the input torque and the transmission ratio of the CVT 2 is applied to an oil path h.

A spring 73b is compressed and arranged in a first end chamber r of the secondary regulator valve 73. A control pressure output from the output port s of the secondary control pressure modulator valve 99 is input to the first end chamber r via an orifice 103. The secondary pressure $P_S$ is input to a second end chamber t of the secondary regulator valve 73 via an orifice 105. Therefore, a spool 73a is operated by the control pressure input to the first end chamber r and the feedback pressure input to the second end chamber t. Then, a hydraulic pressure applied from the port q of the primary regulator valve 72 to a port u of the secondary regulator valve 73 is regulated by communicating the port u to a drain port EX and a lubricating oil port v at a predetermined rate. Then, the secondary pressure $P_S$ regulated based on the control pressure from the output port s of the secondary control pressure modulator valve 99 is applied to an oil path p. A lubricating pressure is applied from the lubricating oil port v of the secondary regulator valve 73 to a lubricating device 107 via an orifice 109.

A spring 99b is compressed and arranged in a first end chamber w of the secondary control pressure modulator valve 99. The control pressure output from the output port s of the secondary control pressure modulator valve 99 is input to a second end chamber x via an orifice 106. The secondary control pressure modulator valve 99 comprises the output ports, a drain port EX, and an input port y applied with the control pressure from the line pressure linear solenoid valve SLT for controlling the line pressure $P_L$ via an orifice 104. The output port s is connected to the input port y and the drain port EX at a predetermined rate. A V-shaped notch y' is formed at the input port y.

A spool 99a is operated based on the control pressure as a feedback pressure input to the second end chamber x and a biasing force of the spring 99b in the first end chamber w. When the control pressure from the line pressure linear solenoid valve SLT is lower than a predetermined pressure, the spool 99a is maintained on right-half side position of FIG. 5, because the biasing force of the spring 99b is higher than the feedback pressure input to the second end chamber x, then the control pressure input to the input port y is output from the output port s. When the control pressure from the line pressure linear solenoid valve SLT is higher than the predetermined pressure, the spool 99a is operated with the feedback pressure input to the second end chamber x and the biasing force of the spring 99b in the first end chamber w. Therefore, at that time, if the control pressure from the line pressure linear solenoid valve SLT is increased, the control pressure from the output port s is maintained at a settled value.

Therefore, the line pressure linear solenoid valve SLT for controlling the line pressure $P_L$ regulates a modulator pressure $P_M$ based on the control signal, which is output from the control unit based on the input torque and the transmission ratio of the CVT 2, and outputs the regulated pressure as the control pressure from the output port m. Then, the primary regulator valve 72 outputs the line pressure $P_L$ in proportion to the input torque between an U/D (under drive) state and an O/D (over drive) state of the CVT 2 based on the control pressure, which is regulated, applied to the first end chamber 1 of the primary regulating valve 72.

When the control pressure from the line pressure linear solenoid valve SLT is lower than the predetermined pressure, the secondary control pressure modulator valve 99 outputs the control pressure, which is not regulated, from the output port s. Then, the secondary regulator valve 73 outputs the secondary pressure $P_S$ in proportion to the input torque between the U/D (under drive) state and the O/D (over drive) state of the CVT 2 based on the control pressure, which is not regulated, applied to the first end chamber r of the secondary regulating valve 73. The secondary pressure $P_S$ at the O/D state is set to a needed pressure which is needed for the torque converter 6. Therefore, the secondary pressure $P_S$ is enough at the U/D state.

The control pressure from the output ports of the secondary control pressure modulator valve 99 is maintained at the settled value when the control pressure from the line pressure linear solenoid valve SLT is higher than the predetermined pressure. Therefore, the line pressure $P_L$ is increased in proportion to the control pressure from the line pressure linear solenoid valve SLT, but the secondary pressure $P_S$ is limited to the settled value based on the 15 settled control pressure from the output port s. The upper limitation of the secondary pressure $P_S$ is lower than a limit pressure of the torque converter 6 and is almost the same with a needed highest pressure. The limit pressure is a minimum pressure at which the torque converter 6 becomes inoperable. The needed highest pressure is a maximum pressure related to the maximum input torque.

Figure 5:
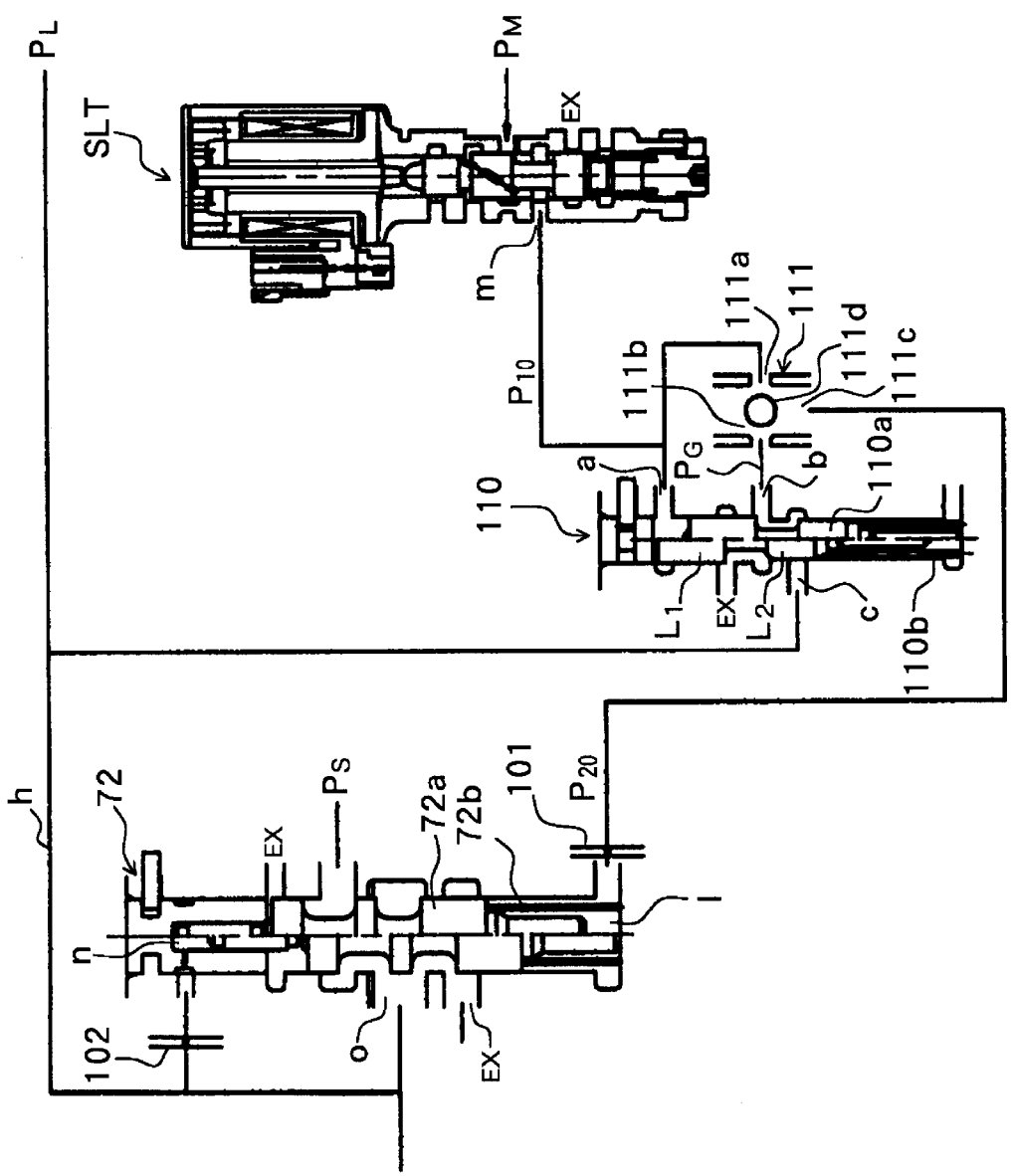
FIG. 5 is an enlargement of a portion of FIG. 4 showing the amplification factor changing device of a first embodiment.

The hydraulic control system for an automatic transmission comprises a signal pressure output device, an amplification factor changing device, and a regulating device, and causes changes between a low gain and a high gain. In the invention, as shown in FIGS. 4 and 5, the amplification factor changing device is interposed between the line pressure linear solenoid valve SLT, as the signal pressure output device, and the primary regulator valve 72, as the regulating device, when compared with the hydraulic circuit as shown in FIGS. 2 and 3. In FIG. 4, elements having the same structures and operations as the elements in FIG. 2 have the same reference numbers and letters as in FIG. 2. Some elements which are not related to the invention of FIG. 4 do not correspond to elements in FIG. 2. For example, the lock-up control valve 95 in FIG. 2 is omitted in FIG. 4.

Figure 3:
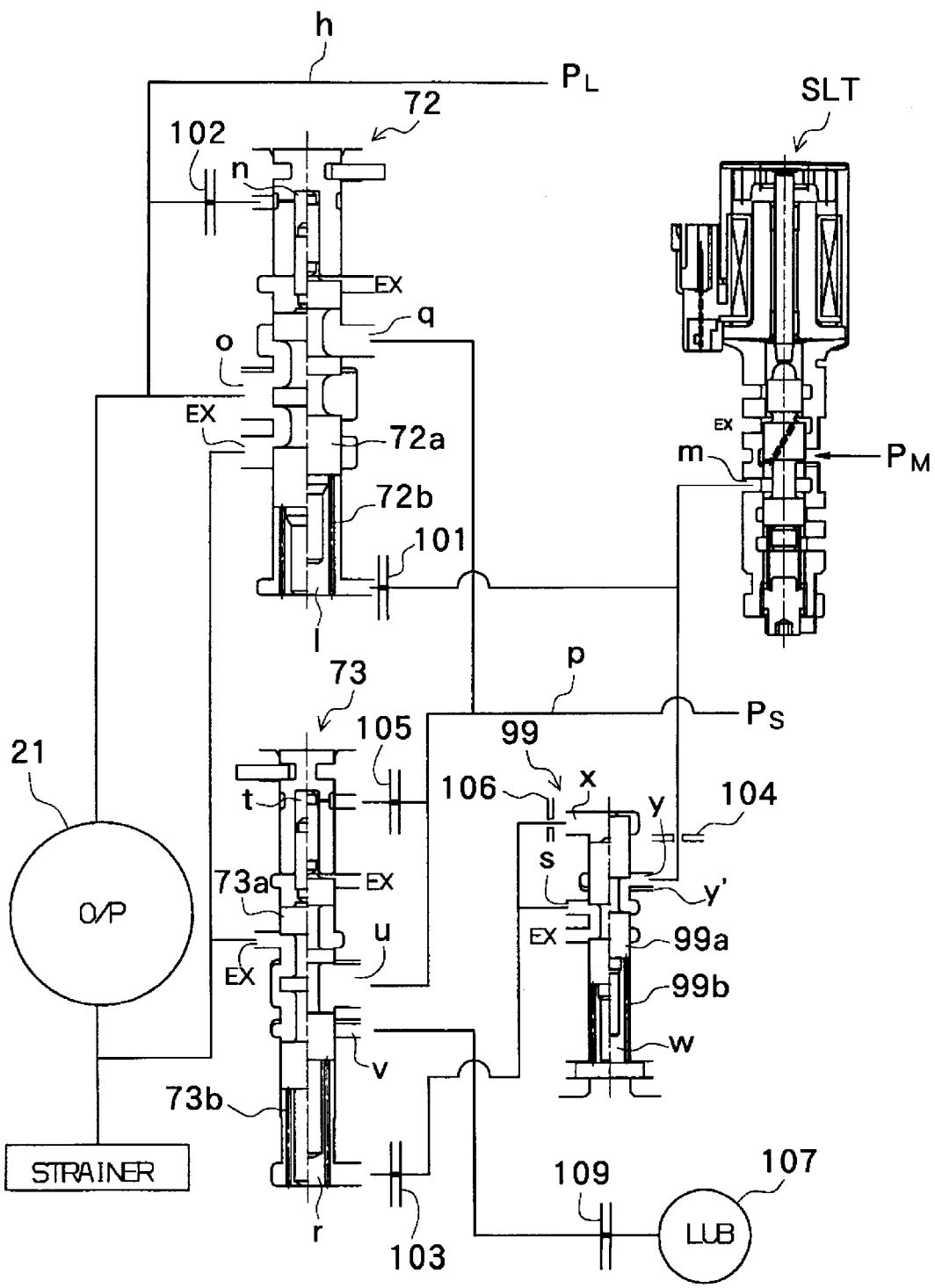
FIG. 3 is an enlargement of a portion of FIG. 2 for explaining the amplification of a line pressure.

The line pressure linear solenoid valve SLT, as the signal pressure output device is the same valve mentioned with reference to FIGS. 2 and 3. That is to say, the line pressure linear solenoid valve SLT regulates the modulator pressure $P_M$ from the solenoid modulator valve 79 based on the control signal, which is based on the input torque and the shift ratio of the CVT 2, from the control unit and outputs the regulated pressure as a first signal pressure $P_{10}$ from the output port m.

In FIGS. 4 and 5 showing the first embodiment, the amplification factor changing device comprises a gain control valve 110 and a check ball 111 as a selecting device. As shown in FIG. 5, the gain control valve 110 comprises a hydraulic chamber a to which the first signal pressure $P_{10}$ output from the line pressure linear solenoid valve SLT is input, an input port c to which the line pressure $P_L$ output from the primary regulator valve 72 is input, and an output port b from which a gain pressure $P_G$ regulated from the line pressure $P_L$ on the basis of the first signal pressure $P_{10}$ is output. The gain control valve 110 further comprises a spool 110a comprising lands $L_1$, $L_2$. The spool 110a is biased upward by a spring 110b.

The check ball 111 comprises two entrances 111a, 111b and one exit 111c. The entrance 111a provides the input of the first signal pressure $P_{10}$ from the line pressure linear solenoid valve SLT. The entrance 111b provides the input of the gain pressure $P_G$ from the gain control valve 110. The higher pressure is selected from the first signal pressure $P_{10}$ and the gain pressure $P_G$ by a ball 111d. Then, the selected pressure is output as a second signal pressure $P_{20}$ from the exit 111c. The second signal pressure $P_{20}$ is input to the first end chamber 1 of the primary regulator valve 72 via the orifice 101. The line pressure $P_L$ as an output pressure is regulated based on the second signal pressure input to the first end chamber 1. The explanation of the structure and the operation of the primary regulator valve 72 as the regulating device is omitted because there is no substantial difference from the previously described structure and operation.

Figure 7:
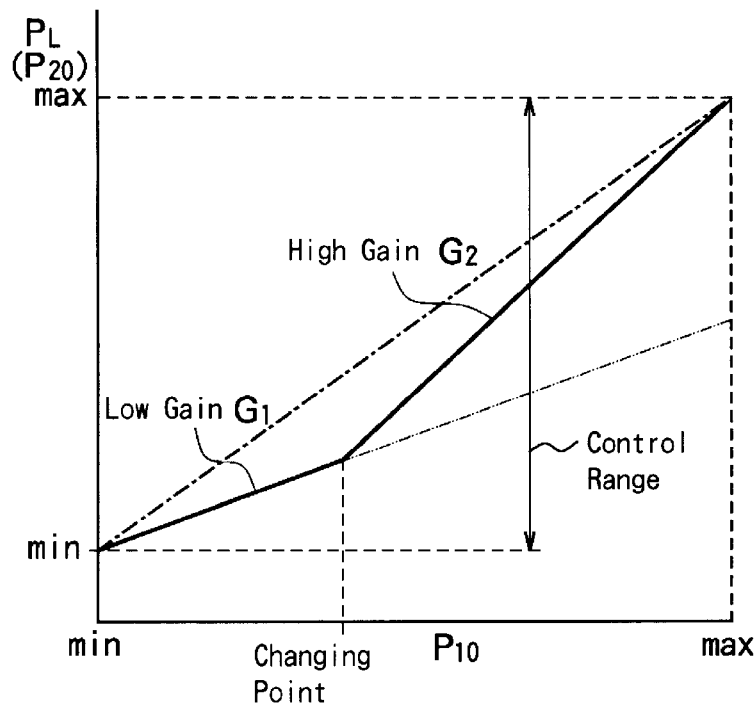
FIG. 7 is a figure showing the relationship between a first signal pressure and a line pressure in the first embodiment.

The operation of the hydraulic control system for an automatic transmission will be described with reference to FIGS. 5 and 7. When the oil pump 21 is operated, the hydraulic pressure $P_L$ from the oil pump 21 is applied to the input port o of the primary regulator valve 72 and applied to the second end chamber n, which is on upper side of the spool 72a as shown in the figures, via the orifice 102. The spool 72a is pushed down toward the spring 72b by the hydraulic pressure input to the second end chamber n, and the spool 72a is maintained in the left-half position shown in FIG. 5. The spool 110a of the gain control valve 110 is pushed up by the spring 110b, and the spool 110a is maintained in the left-half position in FIG. 5. Therefore, the input port c of the gain control valve 110 is closed by the land $L_2$, and the line pressure $P_L$ is not input to the gain control valve 110. That state is shown with a position of min in FIG. 7. The reference numeral ($P_{20}$) on the vertical axis in FIG. 7 shows that the second signal pressure $P_{20}$ is changed with respect to the change of the first signal pressure $P_{10}$.

In that state, when the line pressure linear solenoid valve SLT outputs the first signal pressure $P_{10}$, the first signal pressure $P_{10}$ is input to the hydraulic chamber a of the gain control valve 110, and the first signal pressure $P_{10}$ is input to the entrance 111a of the check ball 111. At that time, the gain pressure $P_G$ regulated from the line pressure $P_L$ is not input to the opposing entrance 111b of the check ball 111. Therefore, the ball 111d is pushed to the left, in FIG. 5, by the first signal pressure $P_{10}$ input to the entrance 111a. As a result, the first signal pressure $P_{10}$ is output as the second signal pressure $P_{20}$ from the exit 111c of the check valve 111. As a result, the second signal pressure $P_{20}$ (currently equal to the first signal pressure $P_{10}$) is input to the first end chamber 1 of the primary regulator valve 72 via the orifice 101.

When the first signal pressure $P_{10}$ is increased, the spool 110a is pushed down gradually by the first signal pressure $P_{10}$, and the second signal pressure $P_{20}$ is increased gradually. Then, the line pressure $P_L$ from the primary regulator valve 72 is also increased. The change rate of the line pressure $P_L$ related to the change rate of the first signal pressure $P_{10}$, which is the gain G, is shown as the low gain $G_1$ in FIG. 7. The low gain $G_1$, which has a small grade, in FIG. 7, is continued to a changing point to be discussed.

When the spool 110a has descended, by increasing the first signal pressure $P_{10}$, so the upper surface of the land $L_2$ passes the upper end of the input port c, the line pressure $P_L$ is input to the input port c of the gain control valve 110, and is output as the gain pressure $P_G$ from the output port b. The gain pressure $P_G$ is input to the entrance 111b of the check ball 111. At that time, the line pressure $P_L$ pushes up the spool 110a because the pressure area of the lower surface of the land $L_1$ of the spool 110a is larger than the pressure area of the upper surface of the land $L_2$. The force pushing up the spool 110a is calculated by multiplying the area difference between the pressure area of the lower surface of the land $L_1$ and the pressure area of the upper surface of the land $L_2$ subject to the gain pressure $P_G$. The gain pressure $P_G$ is regulated by the force and the first signal pressure $P_{10}$ input to the hydraulic chamber a. The gain pressure $P_G$ from the output port b is regulated by setting the difference between the pressure area of the lower surface of the land $L_1$ and the pressure area of the upper surface of the land $L_2$ properly. For example, when the difference between the pressure areas is small, the gain pressure $P_G$ become high with respect to the aforementioned first signal pressure $P_{10}$. Therefore, the gain G can be higher than a high gain $G_2$ discussed below.

When the first signal pressure $P_{10}$ input to the hydraulic chamber a is increased, the first signal pressure $P_{10}$ input to the entrance 111a of the check ball 111 and the gain pressure $P_G$ input to the entrance 111b are increased. Thus, when the first signal pressure $P_{10}$ is low, the first signal pressure $P_{10}$ is output as the second signal pressure $P_{20}$ from the exit 111c because the first signal pressure $P_{10}$ is higher than the gain pressure $P_G$ and the ball 111d of the check ball 111 is pushed to the left.

The increasing rate of the gain pressure $P_G$ input to the entrance 111b is larger than the increasing rate of the first signal pressure $P_{10}$ input to the entrance 111a. The gain pressure $P_G$ is regulated based on the first signal pressure $P_{10}$. The difference between the pressure area of the lower surface of the land $L_1$ and the pressure area of the upper surface of the land $L_2$ is set (manufactured) to be smaller than the pressure area for the first signal pressure $P_{10}$.

Therefore, when the first signal pressure $P_{10}$ is increased gradually, the gain pressure $P_G$ becomes greater than the first signal pressure $P_{10}$ at a point, designated the changing point, shown in FIG. 7. As a result, the ball 111d of the check ball 111 is pushed to the right, the gain pressure $P_G$ is output as the second signal pressure $P_{20}$ from the exit 111c, and the second signal pressure $P_{20}$ is input to the primary regulator valve 72. The change rate, which is the gain, of the line pressure $P_L$ from the primary regulator valve 72 related to the change rate of the first signal pressure $P_{10}$ input to the hydraulic chamber a of the gain control valve 110 is changed to the high gain $G_2$ which is larger than the low gain $G_1$. In this case, the words high and low in the low gain $G_1$ and the high gain $G_2$ are relative words and are not used as high and low in the absolute sense.

The high gain $G_2$ is continued till the maximum value max of the line pressure $P_L$, corresponding to the maximum value of the first signal pressure $P_{10}$ is reached. In FIG. 7, the grade of the graph shows the gain G, and the gain G is the low gain $G_1$ when the grade is small and the gain G is the high gain $G_2$ when the grade is large.

In this embodiment, the needed change range of the line pressure $P_L$, which is between min and max in FIG. 7, is achieved within the change range of the first signal pressure $P_{10}$ output from the line pressure linear solenoid SLT.

For example, in the continuously variable transmission 1 shown in FIG. 1, the high accuracy control for the line pressure $P_L$ and the high line pressure $P_L$ based on the first signal pressure $P_{10}$ are required at different times or conditions. The low gain $G_1$ is needed for the high accuracy control, and the high gain $G_2$ is needed for achieving the high line pressure $P_L$. Therefore, when the gain G is fixed at a certain value as in the related art, it is difficult to achieve both of the high accuracy control and the high line pressure $P_L$.

That is to say, when the change range of the first signal pressure $P_{10}$ is settled, in the case the gain G is set as the low gain $G_1$ for achieving the high accuracy control, as shown in FIG. 7, with the alternating long and two short dash line, the needed maximum value of the line pressure $P_L$ is not achieved. In the case the gain G is set as the high gain $G_2$ for achieving the high line pressure $P_L$, as shown in FIG. 7 with an alternate long and short dash line, high accuracy control for the line pressure $P_L$ is difficult.

Based on the changing point within the change range of the first signal pressure $P_{10}$, in the case where the first signal pressure $P_{10}$ is low and the high accuracy control is needed, the gain G is set as the low gain $G_1$. Then, in the case where the first signal pressure $P_{10}$ is high and the high line pressure $P_L$ is needed, the gain G is set as the high gain $G_2$. Therefore, both of the high accuracy control for the line pressure $P_L$ and the high line pressure $P_L$ are achieved at the appropriate time or under the appropriate conditions.

As the way for achieving the described result, in the first embodiment, the amplification factor changing device comprising the gain control valve 110 and the check ball 111 selects the second signal pressure from the first signal pressure $P_{10}$ and the gain pressure $P_G$, the second signal pressure $P_{20}$ is output to the primary regulator valve 72, and the line pressure $P_L$ is controlled based on the second signal pressure $P_{20}$.

An adjusting mechanism and an adjusting way will now be described. In the hydraulic control system shown in FIG.

9, a first adjusting mechanism 120 and a second adjusting mechanism 130 are added to the hydraulic control system shown in FIG. 5.

The first adjusting mechanism 120 is structured on the lower end portion of the line pressure linear solenoid valve SLT integrally, and comprises a female screw portion 120a formed on the valve body and an adjusting screw 120b engaged with the female screw portion 120a. The spring 140b is compressed and arranged between the adjusting screw 120b and the spool 140a. Therefore, the spring load of the spring 140b toward the spool 140a is increased when the screw amount of the adjusting screw 120b is increased, and is decreased when the screw amount of the adjusting screw 120b is decreased.

The second adjusting mechanism 130 has the same structure as the first adjusting mechanism 120. That is to say, the second adjusting mechanism 130 is structured on the upper end portion of the gain control valve 110 integrally, and comprises a female screw portion 130a formed on the valve body and an adjusting screw 130b engaged with the female screw portion 130a. The spring 110b is compressed and arranged between the adjusting screw 130b and the spool 110a. Therefore, the spring load of the spring 110b toward the spool 110a is increased when the screw amount of the adjusting screw 130b is increased, and is decreased when the screw amount of the adjusting screw 130b is decreased.

Figure 10:
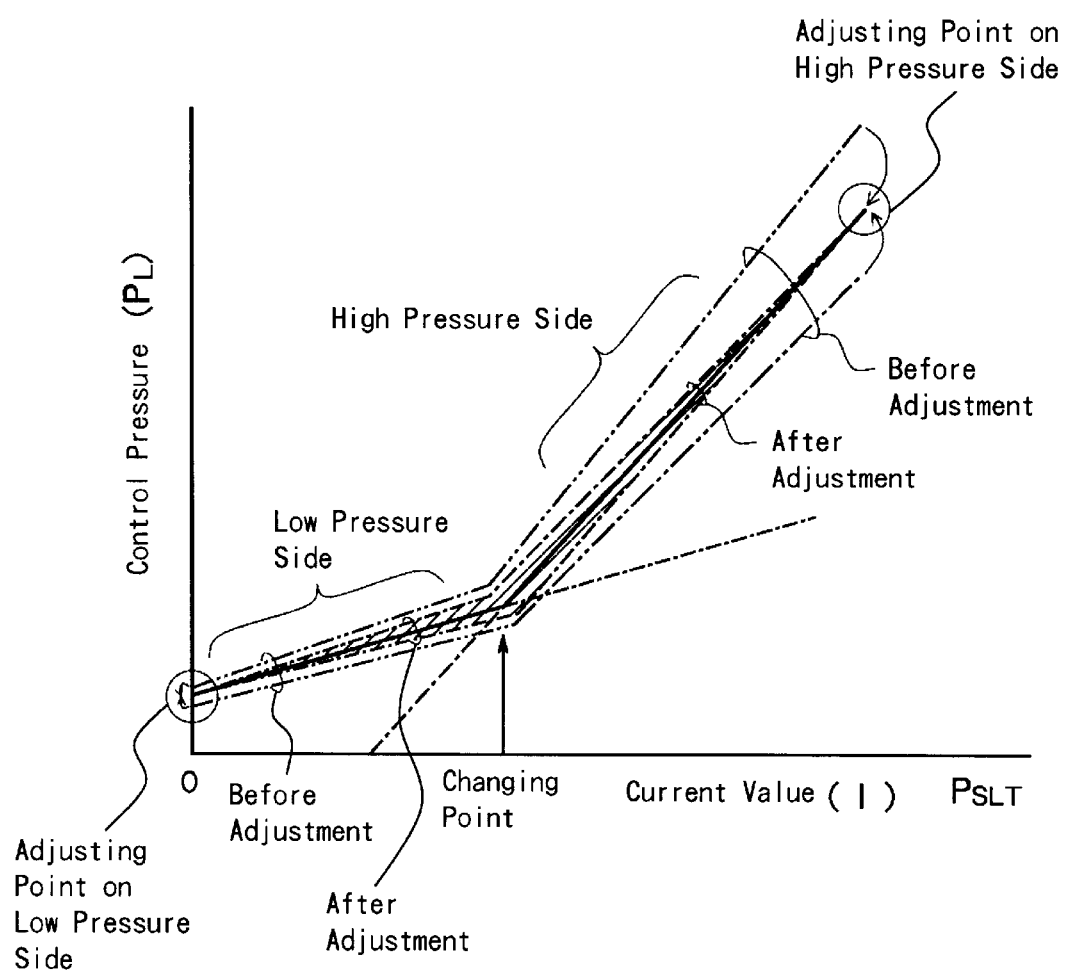
FIG. 10 is a figure showing a relationship between a current value and a control pressure in the first embodiment.

The line pressure $P_L$ as related to a current value I shown in FIG. 10 has the dispersion shown dependent on the hydraulic circuit. The maximum and minimum values of the dispersion before adjustment are shown with the alternate long and two short dashes lines.

In the first embodiment, the gain pressure $P_G$ is influenced by the first signal pressure $P_{10}$. Therefore, the gain pressure $P_G$ is regulated after the first signal pressure $P_{10}$ is regulated.

At first, the current value I applied to the linear solenoid 140c of the line pressure linear solenoid valve SLT is a minimum value, and the line pressure $P_L$, which is the lowest pressure of the line pressure $P_L$, with respect to the minimum current value, is measured. When the lowest pressure of the line pressure $P_L$ is higher than an adjusting point, which is a basic point, on the low pressure side, the screw amount of the adjusting screw 120b of the first adjusting mechanism 120 is increased. Therefore, the spring load of the spring 140b is increased. As a result, the first signal pressure $P_{10}$ is decreased and the lowest pressure of the line pressure $P_L$ is coincided with the adjusting point on low pressure side. When the lowest pressure of the line pressure $P_L$ is lower than the adjusting point, which is the basic point, on the low pressure side, the screw amount of the adjusting screw 120b of the first adjusting mechanism 120 is decreased. Therefore, the spring load of the spring 140b is decreased. As a result, the first signal pressure $P_{10}$ is increased and the lowest pressure of the line pressure $P_L$ is coincided with the adjusting point on low pressure side.

This adjustment is substantially the same as the related art. Thus, as in the related art, at this time, the line pressure $P_L$ has a large dispersion at the high pressure side.

The invention provides for an adjustment to be performed by the second adjustment mechanism 130 at the high pressure side.

The gain pressure, which regulates the line pressure $P_L$ at the high pressure side, is regulated. The current value I to the linear solenoid 140c of the line pressure linear solenoid valve SLT is increased to a maximum value, and the line pressure $P_L$, which is the highest pressure of the line pressure $P_L$, with respect to the maximum current value, is measured. When the highest pressure of the line pressure $P_L$ is higher than an adjusting point, which is a basic point, on the high pressure side, the screw amount of the adjusting screw 130b of the second adjusting mechanism 130 is increased. Therefore, the spring load of the spring 110b is increased. As a result, the gain pressure $P_G$ is decreased and the highest pressure of the line pressure $P_L$ is coincided with the adjusting point on the high pressure side. When the highest pressure of the line pressure $P_L$ is lower than the adjusting point, which is the basic point, on the high pressure side, the screw amount of the adjusting screw 130b of the second adjusting mechanism 130 is decreased. Therefore, the spring load of the spring 110b is decreased. As a result, the gain pressure $P_G$ is increased and the highest pressure of the line pressure $P_L$ is coincided with the adjusting point on the high pressure side.

The dispersion of the line pressure $P_L$ with respect to the current value I in each hydraulic circuit is decreased by regulating the line pressure $P_L$ at two points that are the adjusting point on the low pressure side and the adjusting point on the high pressure side. The dispersion after the adjustments is shown with an oblique line portion between the alternate long and short dash lines in FIG. 10. The lowest pressure of the line pressure $P_L$ as the adjusting point on low pressure side and the highest pressure of the line pressure $P_L$ as the adjusting point on high pressure side are related to the current value I with a high degree of accuracy.

Therefore, the need to consider the strength and durability of the hydraulic circuit and of setting the lowest control pressure to be high is removed.

The second embodiment will now be described. In the second embodiment, when the first signal pressure $P_{10}$ is low, the first signal pressure $P_{10}$ is output as the second signal pressure $P_{20}$ to the primary regulator valve 72. When the first signal pressure $P_{10}$ is high, both of the first signal pressure $P_{10}$ and the gain pressure $P_G$ are output as the second signal pressure $P_{20}$ to the primary regulator valve 72.

Figure 6:
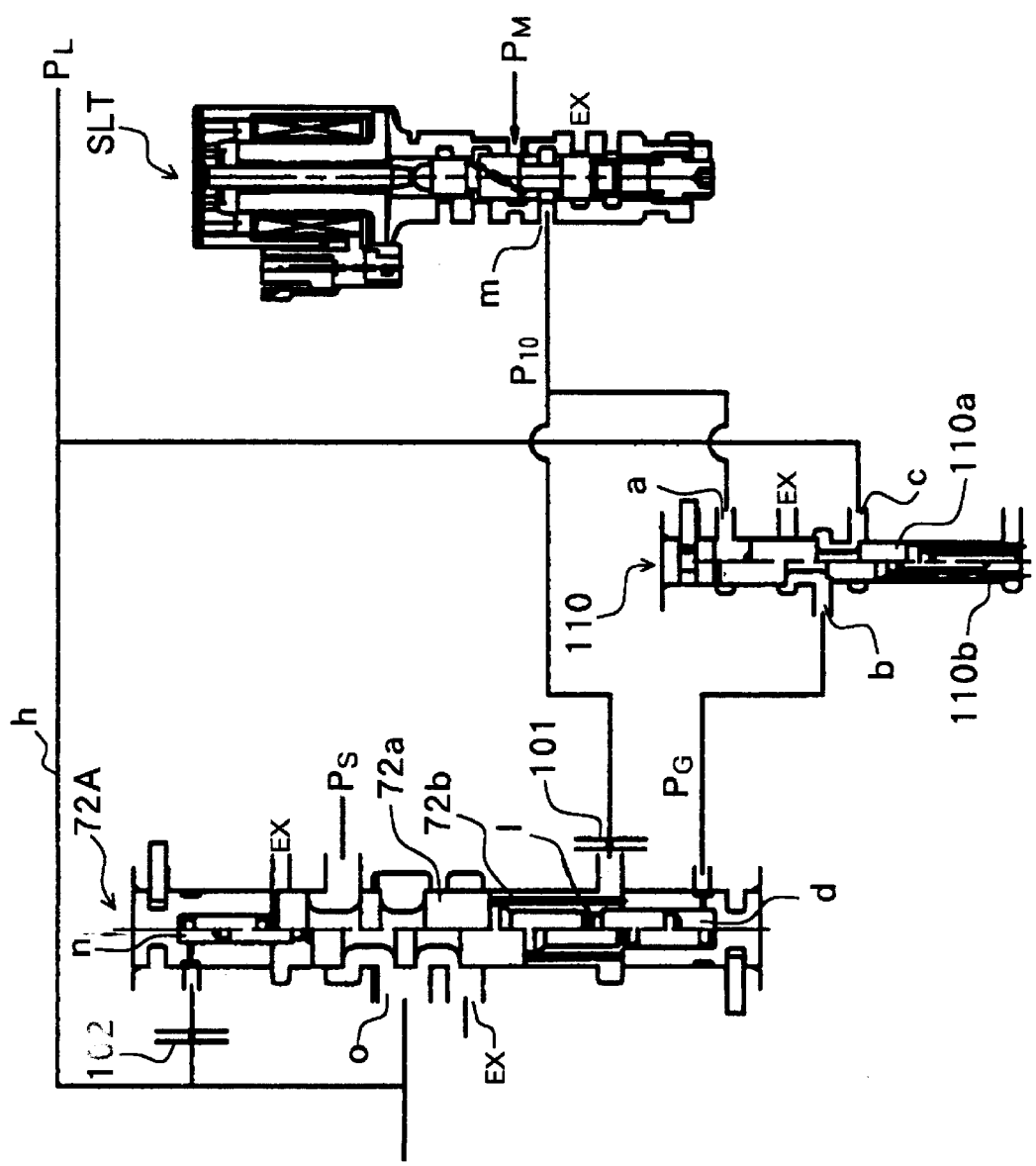
FIG. 6 is a modified enlargement of a portion of FIG. 4 showing an amplification factor changing device of a second embodiment.

The second embodiment is shown in FIG. 6. The elements having the same structure and the same operations are identified with the same reference numbers or numerals as the previous embodiment. Where the explanations are the same, they are omitted, and only the portions that differ from the first embodiment will be described.

In FIG. 6, the line pressure linear solenoid valve SLT, as the signal pressure output device, and the gain control valve are the same as those in FIG. 5. The primary regulator valve 72A, as the regulating device, is expanded at one end adding a hydraulic chamber d as compared with the regulator valve 72 of FIGS. 5 and 9.

In the second embodiment, an amplification factor changing device comprises the hydraulic chambers 1, d of the primary regulator valve 72A and the gain control valve 110.

The first signal pressure $P_{10}$ output from the line pressure linear solenoid valve SLT is input to the hydraulic chamber 1 of the primary regulator valve 72A and pushes up the spool 72a gradually. Further, the first signal pressure $P_{10}$ is input to the hydraulic chamber a of the gain control valve 110 and pushes down the spool 110a gradually.

Figure 8:
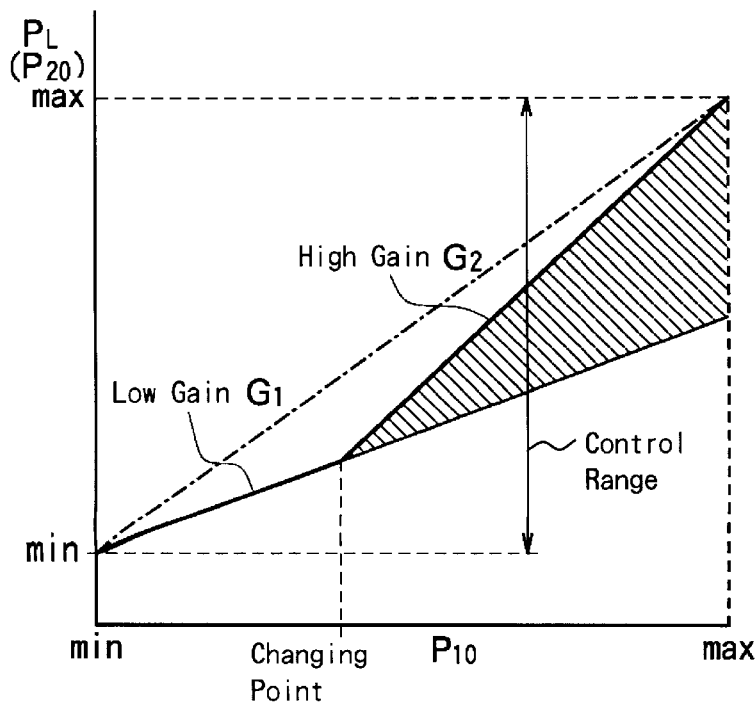
FIG. 8 is a figure showing the relationship between a first signal pressure and a line pressure in the second embodiment.

In this state, as shown in FIG. 8, the gain G is set as the low gain $G_1$ and the low gain $G_1$ is maintained until the first signal pressure $P_{10}$ reaches the changing point.

As the first signal pressure $P_{10}$ from the line pressure linear solenoid valve SLT, input to the hydraulic chamber a of the gain control valve 110, gradually pushes down the spool 110a, the gain pressure $P_G$ is output from the output port b and input to the hydraulic chamber d of the primary regulator valve 72A. The spool 72a is divided into two portions. One of them is an upper portion which is arranged so that the upper portion is pushed up by the first signal pressure $P_{10}$. The other one is an lower portion which is arranged so that the lower portion is pushed up by the gain pressure $P_G$ and is pushed down by the first signal pressure $P_{10}$. In the lower portion, the pressure area for the first signal pressure on the upper surface and the pressure area for the gain pressure on the lower surface of the lower portion are same. The upper portion and the lower portion are in contact with each other at the position on left-half side in FIG. 6. When the gain pressure $P_G$ is lower than the first signal pressure $P_{10}$, the lower portion is pushed down by the first signal pressure $P_{10}$. Therefore, the gain pressure $P_G$ does not push up the upper portion of the spool 72a of the primary regulator valve 72A via the lower portion. Then, the upper portion is pushed up by the first signal pressure $P_{10}$. When the first signal pressure $P_{10}$ is increased above the changing point, the gain pressure $P_G$ is higher than the first signal pressure $P_{10}$. Then the upper portion is pushed up directly by the first signal pressure $P_{10}$ and is also pushed up by the gain pressure $P_G$ via the lower portion. That is to say, the spool 72a is pushed up by both of the first signal pressure $P_{10}$ and the gain pressure $P_G$. Therefore, in the second embodiment, the first signal pressure $P_{10}$ operates as the second signal pressure $P_{20}$ which pushes up the spool 72a of the primary regulator valve 72A when the first signal pressure $P_{10}$ is not increased to the changing point, and both of the first signal pressure $P_{10}$ and the gain pressure $P_G$ operate as the second signal pressure $P_{20}$ when the first signal pressure is increased above the changing point.

In the first embodiment, the higher pressure is selected from the first signal pressure $P_{10}$ and the gain pressure $P_G$ and operates as the second signal pressure $P_{20}$. But in the second embodiment, as shown in FIG. 8, a pressure shown with a oblique line portion is added to the first signal pressure $P_{10}$ by the gain pressure $P_G$. Therefore, the change from the low gain $G_1$ to the high gain $G_2$ and the change from the high gain $G_2$ to the low gain $G_1$ are performed smoothly.

Figure 11:
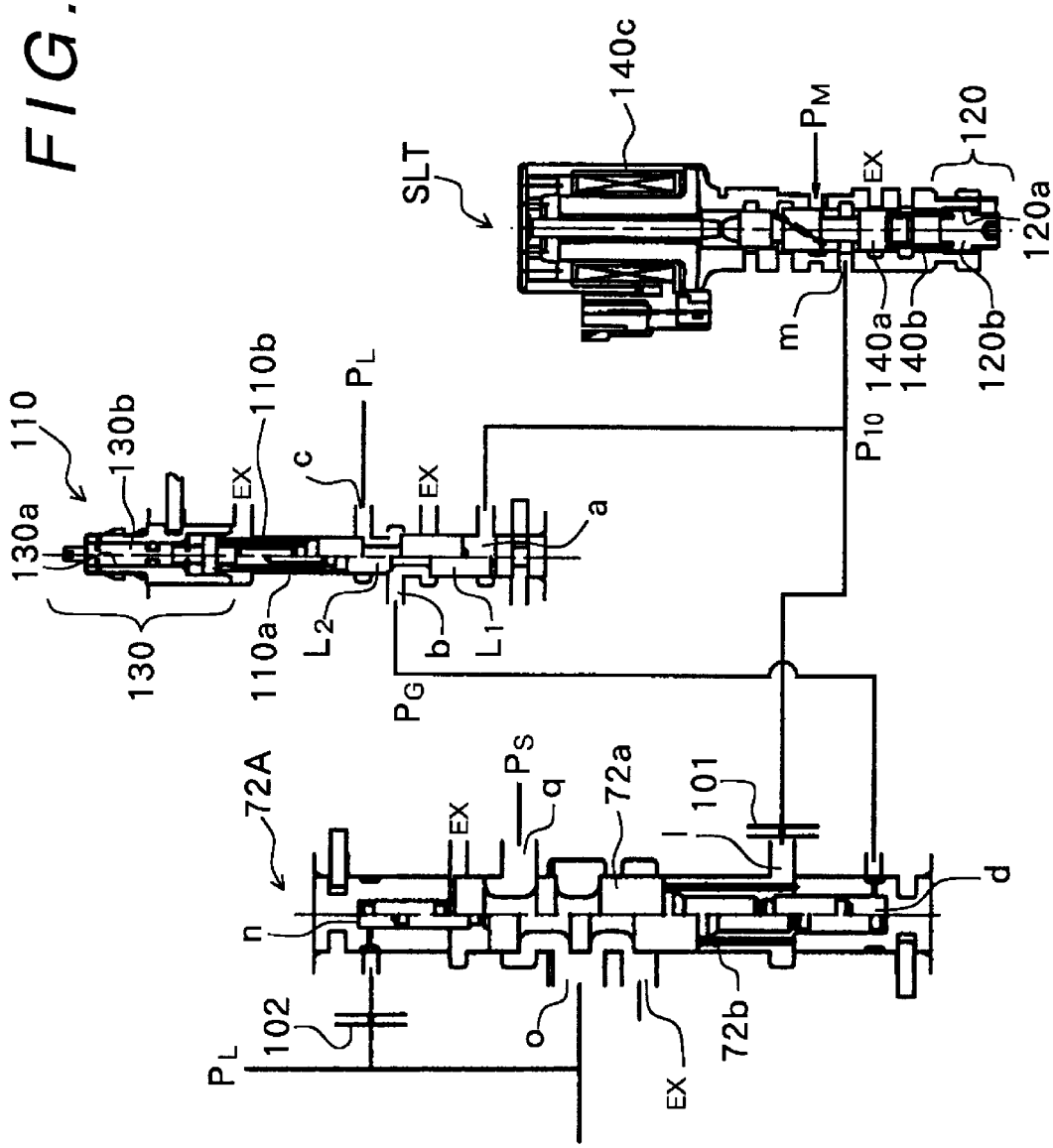
FIG. 11 is a figure showing the hydraulic circuit having a adjusting mechanism in the second embodiment.
Figure 12:
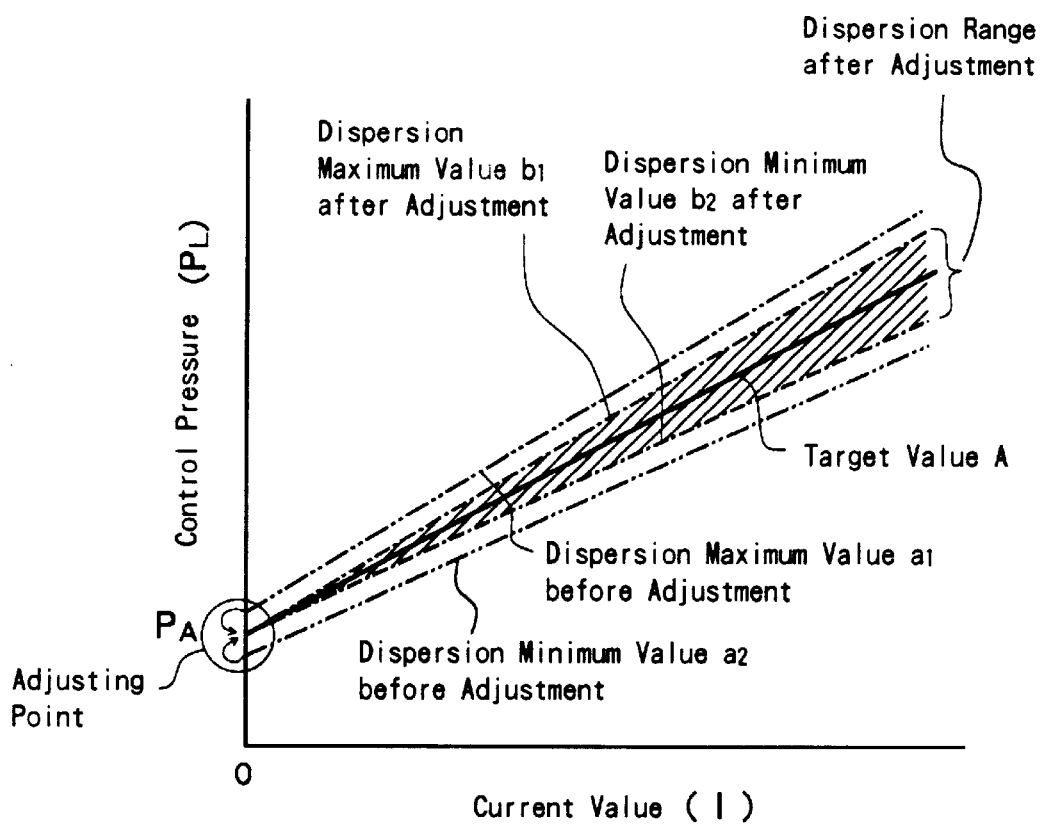
FIG. 12 is a figure showing a relationship between a current value and a control pressure in the related art.

FIG. 11 shows the hydraulic control system in which the first adjusting mechanism 120 and the second adjusting mechanism 130 are added to the hydraulic control system shown in FIG. 6.

Figure 9:
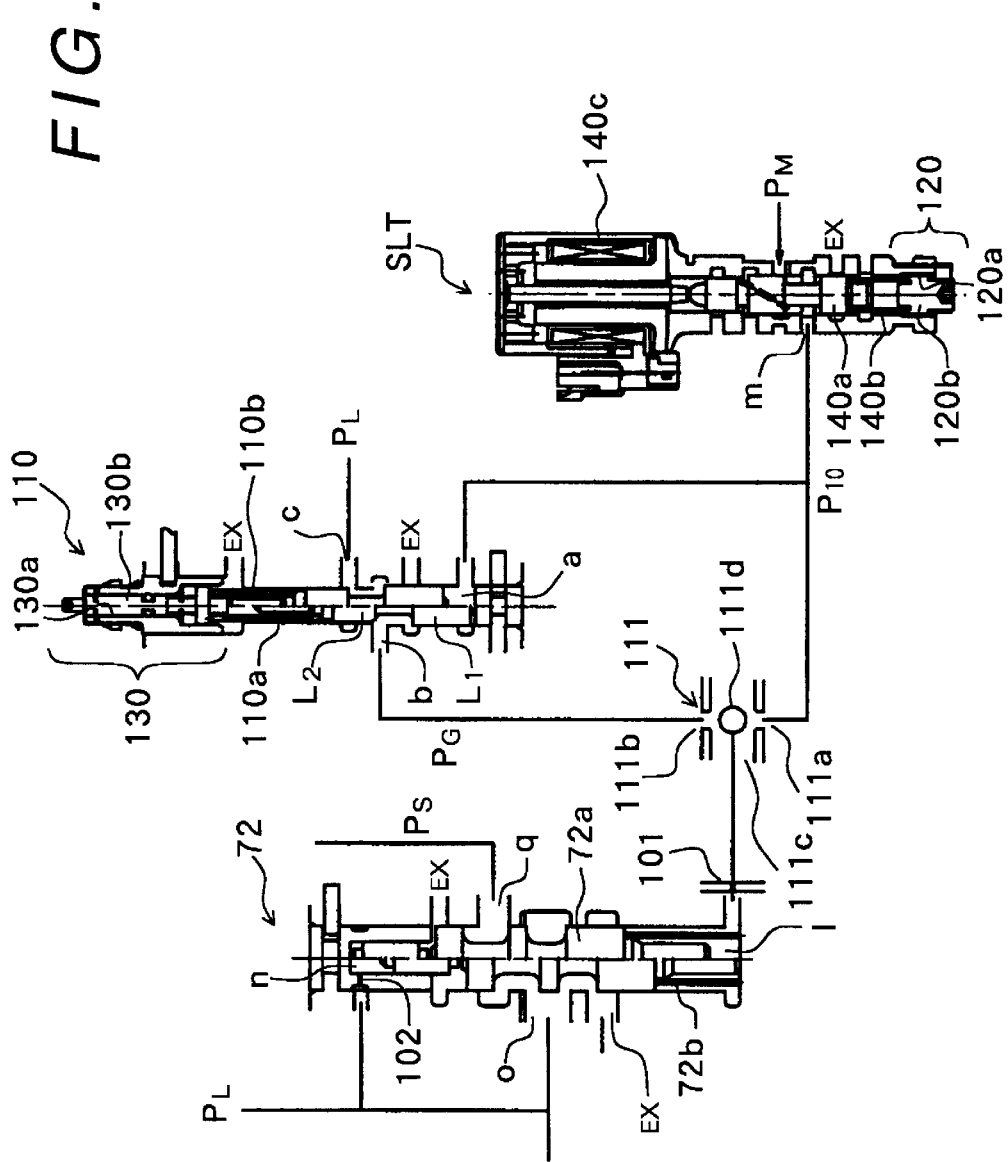
FIG. 9 is a figure showing the hydraulic circuit having a adjusting mechanism in the first embodiment.

The hydraulic control system shown in FIG. 11 has the same effect as the hydraulic control system shown in FIG. 9. That is to say, the line pressure $P_L$ is regulated by controlling the primary regulator valve 72A with the first adjusting mechanism 120 of the line pressure linear solenoid valve SLT and the second adjusting mechanism 130 of the gain control valve 110 at the adjusting point on the low pressure side and the adjusting point on the high pressure side. Therefore, the dispersion of the line pressure $P_L$ based on the current value I in each hydraulic circuit is decreased. The dispersion after the adjustments is shown with an oblique line portion between the alternate long and short dash lines in FIG. 10.

What is claimed is:

1. A hydraulic control system for an automatic transmission, comprising:

a signal pressure output device which outputs a first signal pressure, an amplification factor changing device, comprising a gain control valve which outputs a gain pressure regulated based on the first signal pressure and a selecting device which selects second signal pressure from the first signal pressure and the gain pressure based on their strength, to which is input the first signal pressure from the signal pressure output device and which outputs the second signal pressure selected by the selecting device based on the first signal pressure; and a regulating device to which is input the second signal pressure from the amplification factor changing device and which regulates an output pressure based on the second signal pressure wherein the amplification factor changing device changes an amplification factor, which is a change rate of the output pressure with respect to the change of the first signal pressure, to a low amplification factor and a high amplification factor within a change range of the first signal pressure.

2. The hydraulic control system for an automatic transmission according to claim 1, wherein the selecting device comprises a check ball which selects the higher pressure from the first signal pressure and the gain pressure as the second signal pressure, and outputs the second signal pressure to the regulating device.

3. The hydraulic control system for an automatic transmission according to claim 2, wherein the first signal pressure is input to the regulating device as the second signal pressure and the amplification factor is changed to the low amplification factor when the first signal pressure from the signal pressure output device is lower than a predetermined value, and the gain pressure, which is higher than the first signal pressure, is input to the regulating device as the second signal pressure and the amplification factor is changed to the high amplification factor when the first signal pressure from the signal pressure output device is higher than the predetermined value.

4. The hydraulic control system for an automatic transmission according to claim 1, wherein the gain control valve regulates the output pressure regulated by the regulating device to the gain pressure.

5. The hydraulic control system for an automatic transmission according to claim 1, wherein the gain control valve regulates the gain pressure from low to high when the first signal pressure is changed from low to high.

6. The hydraulic control system for an automatic transmission according to claim 1, further comprising:

a first adjusting mechanism which regulates the first signal pressure by adjusting the signal pressure output device; and a second adjusting mechanism which regulates the gain pressure by adjusting the gain control valve, wherein the first adjusting mechanism regulates the first signal pressure based on a basic point on a low pressure side of the output pressure from the regulating device, and the second adjusting mechanism regulates the gain pressure based on a basic point on a high pressure side of the output pressure from the regulating device.

7. The hydraulic control system for the automatic transmission according to claim 6, wherein the adjustment for the first signal pressure by the first adjusting mechanism is performed earlier than the adjustment for the gain pressure by the second adjusting mechanism.

8. A hydraulic control system for an automatic transmission, comprising:

a signal pressure output device which outputs a first signal pressure;

an amplification factor changing device, comprising a gain control valve which outputs a gain pressure regulated based on the first signal pressure, to which is input the first signal pressure from the signal pressure output device and which outputs a second signal pressure based on the first signal pressure; and a regulating device to which is input the second signal pressure from the amplification factor changing device and which regulates an output pressure based on the second signal pressure, wherein the amplification factor changing device changes an amplification factor, which is change rate of the output pressure with respect to the change of the first signal pressure, to a low amplification factor and a high amplification factor within a change range of the first signal pressure, the amplification factor changing device outputs the first signal pressure as the second signal pressure to the regulating device when the first signal pressure is lower than a predetermined value, and the amplification factor changing device outputs both of the first signal pressure and the gain pressure as the second signal pressure to the regulating device when the first signal pressure is higher than the predetermined value.

9. The hydraulic control system for an automatic transmission according to claim 7, wherein the gain control valve regulates the output pressure regulated by the regulating device to the gain pressure.

10. The hydraulic control system for an automatic transmission according to claim 7, wherein the gain control valve regulates the gain pressure from low to high when the first signal pressure is changed from low to high.

11. The hydraulic control system for an automatic transmission according to claim 7, further comprising:

first adjusting mechanism which regulates the first signal pressure by adjusting the signal pressure output device; and a second adjusting mechanism which regulates the gain pressure by adjusting the gain control valve, wherein the first adjusting mechanism regulates the first signal pressure based on a basic point on a low pressure side of the output pressure from the regulating device; and the second adjusting mechanism regulates the gain pressure based on a basic point on a high pressure side of the output pressure from the regulating device.

12. The hydraulic control system for the automatic transmission according to claim 11, wherein the adjustment for the first signal pressure by the first adjusting mechanism is performed earlier than the adjustment for the gain pressure by the second adjusting mechanism.

* * * * *